United States Patent [19]

Winterheimer et al.

[11] Patent Number: 5,033,182
[45] Date of Patent: Jul. 23, 1991

[54] METHOD OF MAKING A REFRIGERATOR CABINET

[75] Inventors: Sylvester A. Winterheimer, Center Township, Vanderburgh County; Kenneth L. Hortin, Armstrong Township, Vanderburgh County; Harry L. Tillman, Knight Township, Vanderburgh County, Ind.

[73] Assignee: Whirlpool Corporation, Benton Harbor, Mich.

[21] Appl. No.: 535,130

[22] Filed: Jun. 8, 1990

[51] Int. Cl.[5] .............................................. B23P 25/00
[52] U.S. Cl. .................................... 29/460; 29/527.1; 29/530; 312/214
[58] Field of Search ....................... 29/460, 527.1, 530; 312/214

[56] References Cited

U.S. PATENT DOCUMENTS

| | | | |
|---|---|---|---|
| 4,771,532 | 9/1988 | Taylor, Jr. et al. | 312/214 X |
| 4,821,399 | 4/1989 | Markley et al. | 312/214 X |
| 4,862,577 | 9/1989 | Cordill et al. | 29/530 X |
| 4,914,341 | 4/1990 | Weaver et al. | 312/214 |

Primary Examiner—Timothy V. Eley
Assistant Examiner—C. Richard Martin
Attorney, Agent, or Firm—Wood, Phillips, Mason, Recktenwald & Vansanten

[57] ABSTRACT

A typical plastic liner refrigerator includes an outer shell of sheet metal, an inner liner of plastic and polyurethane insulation foamed in place between the inner liner and the outer shell. In order to counter stresses which can cause large unsightly cracks to form in the liner, the liner is provided with stress control slots, slits or cuts at locations where they can be covered up, such as the mullion panel.

19 Claims, 2 Drawing Sheets

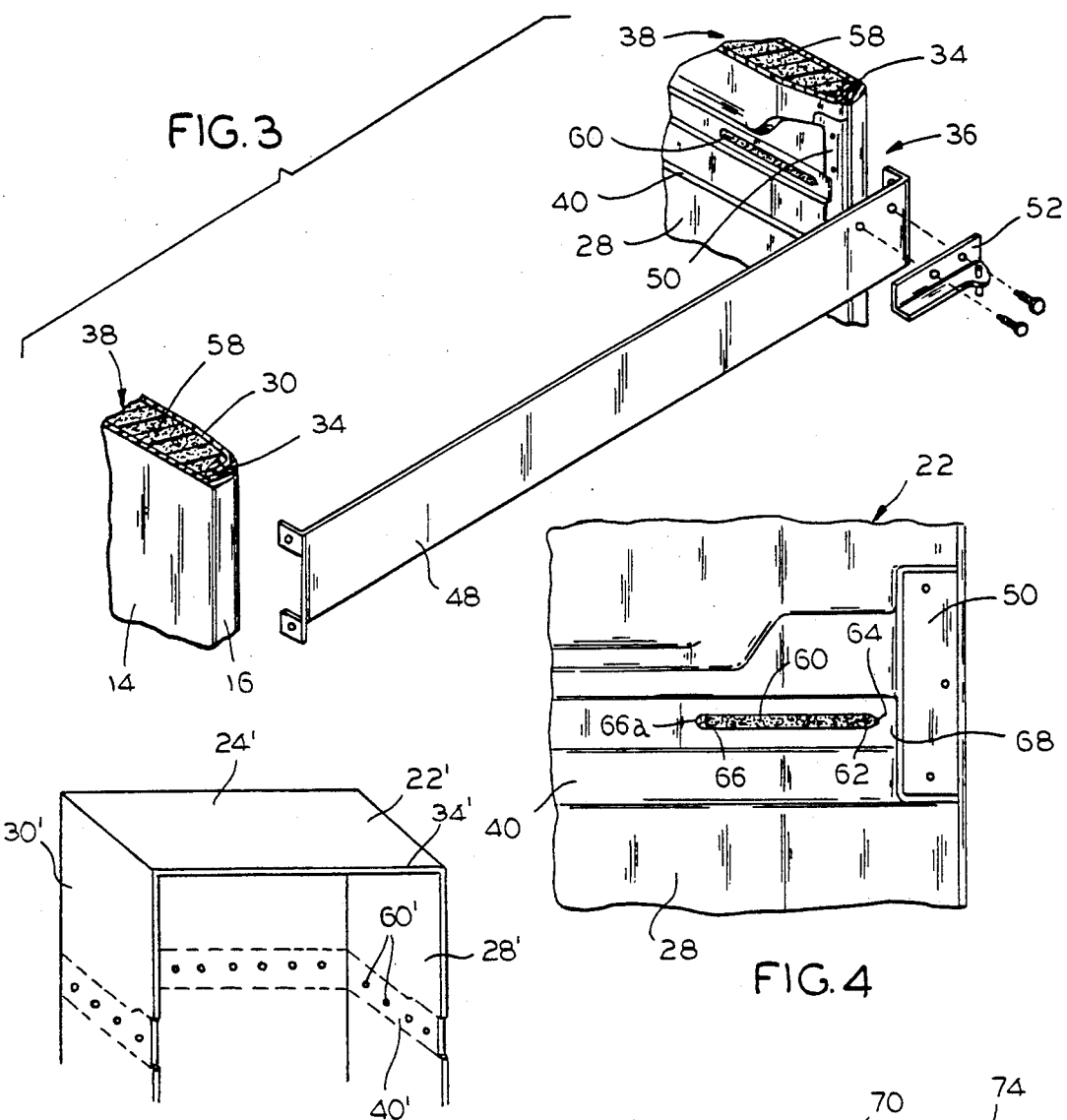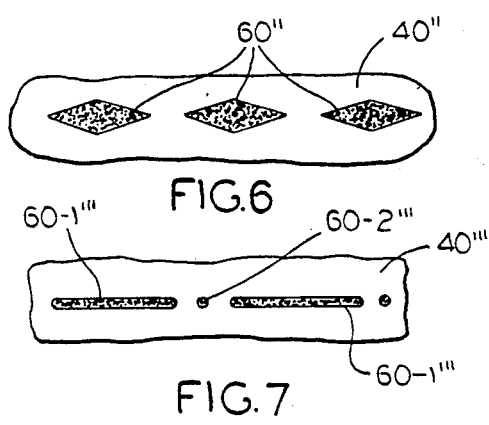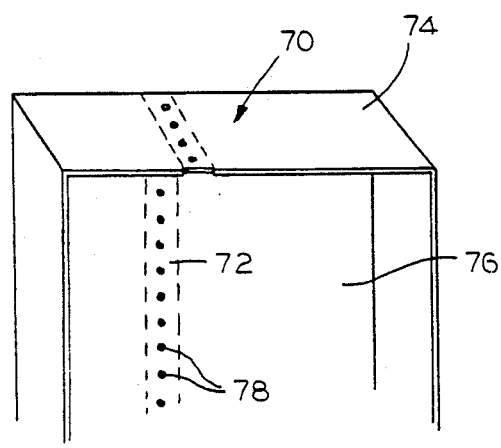

METHOD OF MAKING A REFRIGERATOR CABINET

FIELD OF THE INVENTION

This invention relates to refrigerator cabinets and, more particularly, to a method which employs a stress controlling slot in the mullion area of a liner.

BACKGROUND OF THE INVENTION

In the manufacture of refrigerator cabinets, there is usually an outer shell of sheet metal, an inner liner of plastic and polyurethane insulation foamed in place between the inner liner and the outer shell. To achieve acceptable cabinet strength, some adhesion is necessary between the foam and the shell and liner. With such adhesion, the cabinet cannot react to forces of impact, twist, or more commonly, thermal expansion and contraction.

This reaction problem is caused by a combination of natural foam adhesion, freezer-refrigerator surface temperature differential, and "lock-up" which occurs around the normal surface variations of shelf slides, studs, air ducts, etc. When exposed to a large temperature differential between the refrigerated compartments, particularly the freezer space, and the ambient conditions outside of the shell, and when further subjected to large temperature swings, the combination of high coefficient of expansion/ contraction for plastic and the adhesion factor, creates excessive tensile stresses in the liner causing it to crack and pull apart at the location of highest stress.

The above-discussed problems are magnified in larger liners which are used in larger refrigerators, such as on the order of 25 cubic feet.

The present invention is intended to solve one or more of the problems discussed above in a novel and simple manner.

SUMMARY OF THE INVENTION

In accordance with the invention, there is disclosed herein the addition of a pierced slot in a liner mullion channel to concentrate stresses thereat.

Broadly, there is disclosed herein a method of assembling a plastic liner refrigerator cabinet. This method comprises the steps of providing an outer, metal shell including walls defining a front opening; forming a plastic tub-shaped liner, the liner including an elongate channel for receiving a partition separating the cabinet into two refrigerated compartments with a plurality of longitudinally spaced closed-end apertures in the channel to concentrate stresses at the apertures; inserting the liner in the shell through the front opening to define a space between the liner and the shell walls, and filling the space with foamed-in-place insulation which adheres to the liner and shell.

In accordance with one aspect of the invention, the liner forming and trimming step includes the step of adding stress-starter notches, or slots or apertures in the liner adjacent the front opening of the shell.

It is a feature of the invention that the apertures comprise elongate slots.

It is a further feature of the invention wherein each slot is formed to diverge to a point at one end.

It is still a further feature of the invention wherein each slot is formed to be semi-circular at one end.

Particularly, in accordance with the one aspect of the invention, each slot comprises a pierced slot which diverges at one closed end to a point which defines a sharp angle at the front to concentrate the stress at this point and induce a crack through the liner at the most desirable location, i.e. behind the partition, relieving the tensile stress.

In accordance with another embodiment of the invention, the apertures comprise a plurality of spaced circular openings.

In accordance with a further embodiment of the invention, the apertures comprise a plurality of spaced diamond-shaped openings.

In accordance with still a further embodiment of the invention, the apertures comprise a plurality of closely spaced elongate slots, with a circular aperture disposed between adjacent ones of the elongate slots.

Thus, in accordance with the invention, the liner is formed with closed-end slots to induce a crack at the most desirable location behind the separator partition, while maintaining integrity of the liner. Specifically, the liner by using closed end slots is more durable in handling and installing.

Further features and advantages of the invention will readily be apparent from the specification and from the drawings.

BRIEF DESCRIPTION OF THE DRAWINGS

FIG. 3 is a cut-away exploded view illustrating the elongate slot formed according to the invention in the liner rearwardly of the mullion bar;

FIG. 4 is a partial elevation view illustrating the mullion channel in the assembled cabinet, with parts removed for clarity;

FIG. 5 is a perspective view of a liner formed according to a first alternative embodiment of the invention;

FIG. 6 is a detailed view illustrating apertures used according to a second alternative embodiment of the invention;

FIG. 7 is a detailed view illustrating apertures used according to a third embodiment of the invention; and FIG. 8 illustrates a liner for a side-by-side refrigerator using apertures similar to that of FIG. 5.

DETAILED DESCRIPTION OF THE INVENTION

Figure 1:
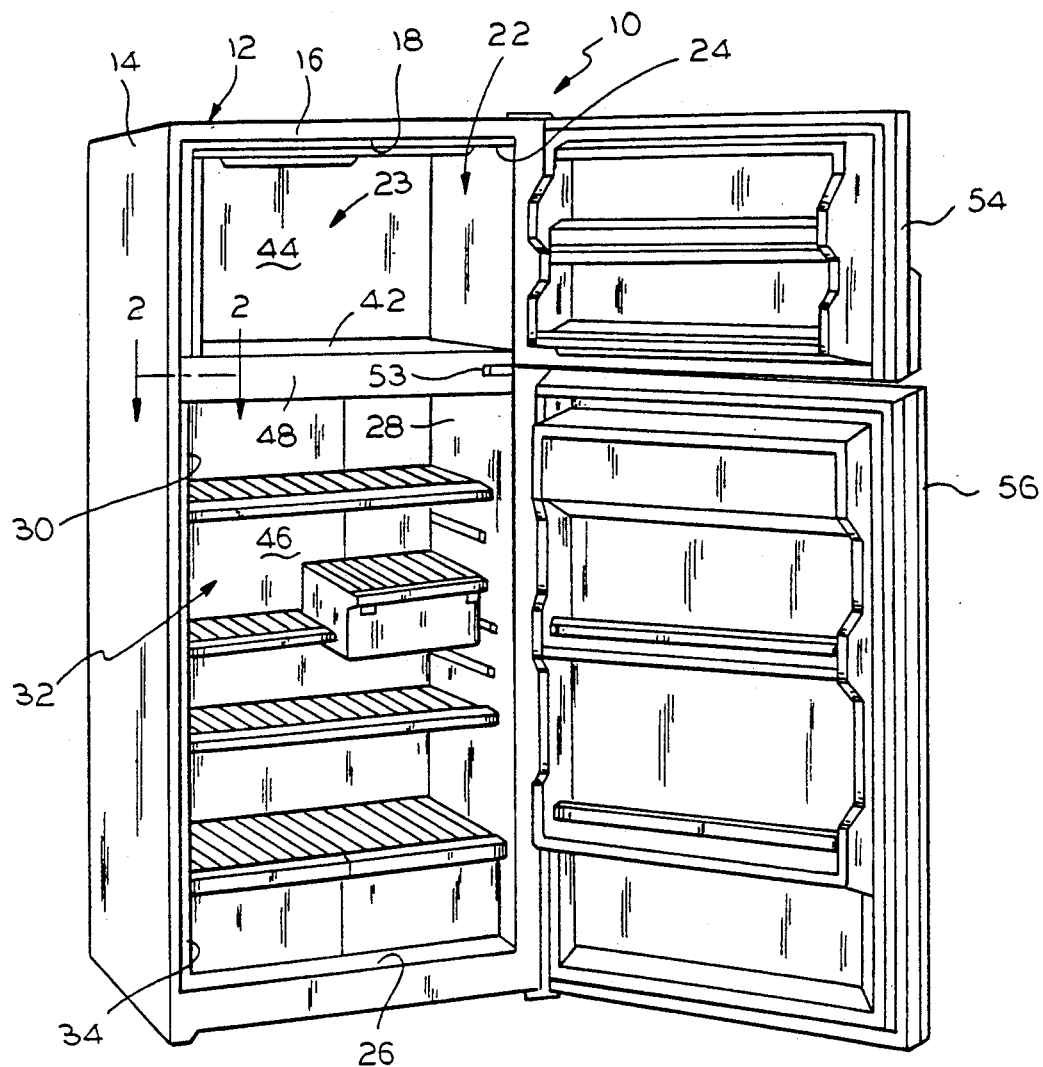
FIG. 1 is a perspective view of a refrigerator cabinet assembled according to the method of the invention.

With reference to FIG. 1, a refrigerator cabinet 10 is illustrated which is assembled according to a method of the present invention. Particularly, the cabinet 10 comprises a plastic liner refrigerator employing a stress controlling slot or series of concealed slots in the mullion area, as described more specifically below.

Figure 2:
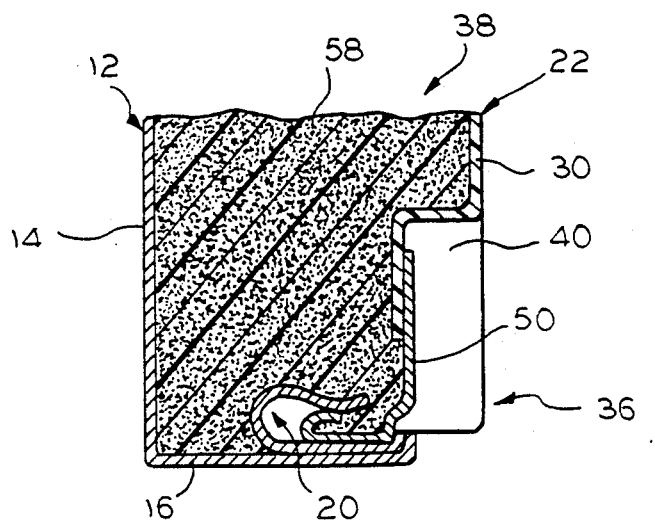
FIG. 2 is a sectional view taken along the line 2—2 of FIG. 1, with the separator partition removed.

With reference also to FIG. 2, the cabinet 10 includes an outer, metal shell 12 provided with outer walls 14 connected to an inturned flange 16 to define a front opening 18. The front flange 16 is further double reversed bent to form a channel 20, as is well known.

A tub-shaped liner 22 molded of plastic, such as ABS plastic, has connected rear, top, bottom and opposite side walls 23, 24, 26, 28 and 30, respectively, to define a refrigerated space 32. The side walls 28 and 30 and top wall 24 include an outturned flange 34 continuous, except at a mullion area 36. During installation of the liner 22 in the shell 12, the flange 34 is inserted in the shell channel 20 to define an insulation space 38 between the liner 22 and shell 12.

With reference also to FIG. 3, a formed channel 40 is provided in each liner side wall 28 and 30, and the rear wall 23. Only the portion in the side wall 28 is shown, extending rearwardly from the mullion area 36. A mullion panel, or partition, 42, see FIG. 1, is inserted in the cabinet 10 and is received in the channel 40 to separate the refrigerated space 32 into a below-freezing, or freezer, compartment 44 and an above-freezing, or fresh food, compartment 46. A mullion bar 48 is fastened to mullion brackets 50, secured in the channel 20 at the mullion area 36, to provide a front wall surface forwardly of the partition 42 extending between the cabinet flange 16 at each opposite side wall. The details of assembling and mounting the mullion bar 48 in the cabinet 12 is described in Cordill et al. U.S. Pat. No. 4,765,696, owned by the assignee hereof, the specification of which is hereby incorporated by reference herein.

Suitable brackets, such as hinge bracket 52, see FIG. 3, are mounted to the mullion bar 48 for hingedly mounting a freezer door 54 and fresh food door 56 providing selective access to the respective freezer compartment 44 and fresh food compartment 46, as is well known.

During the assembly process, after the liner 22 is inserted in the shell 12, as discussed above, a polyurethane insulation 58 is foamed in place in the space 38 between the liner 22 and shell 12. The insulation 58 is selected to provide adhesion with both the shell 12 and liner 22 to achieve acceptable cabinet strength.

When the refrigerator cabinet 10 is subjected to large decreases in temperature between the outside of the shell 12 and the refrigerated space 32, the combination of high coefficient of expansion/contraction for the plastic and the adhesion factor, described immediately above, create excessive tensile stresses in the liner 22 which can cause it to crack and pull apart at the location of highest stress.

In accordance with the invention, the liner 22 is provided with stress control slots, slits or cuts in the liner at a location where they can be covered up from normal view, such as in the mullion channel 40.

With reference to FIGS. 3 and 4, and according to a first embodiment of the invention, an elongate slot 60 is provided through the liner 22 in the mullion channel 40 at the sidewall 28. Although only a single slot 60 is illustrated, a corresponding slot is provided in the mullion channel at the opposite side wall 30.

The slot 60 converges at a front end 62 to form a sharp angle point 64. The rear end 66 is curved to form a semi-circle 66a. The liner 22 includes a tab 68 extending forwardly of the slot 60 to connect the forward, flangeless edge of the liner 22 at the mullion area 36 above and below the slot 60 so that the slot 60 has opposite closed ends.

The tab 68 provides a liner which is more durable during handling and assembly. Specifically, the tab 68 renders the liner 22 more rigid and stable when it is installed in the shell 12 and assures proper orientation of the liner 22 than might result with an open ended slot. Once the refrigerator cabinet 10 is placed in use, the characteristic of the slot 60 with the point 64 concentrates stresses at the point 64 for stress relief. Particularly, the stress relief point promotes cracking or failure, if any, within the mullion channel 40 which is concealed by the partition 42 and mullion bar 48, see FIG. 1. The use of the semi-circular end 66 prevents cracking at the rear end of the slot 60.

The slot 60 operates to counter high stresses at the front portions of the liner 22. Although not shown, a suitable expansion joint may be included in the liner rear wall 22 and portions of the side walls 28 and 30 adjacent thereto, which such expansion joint may also form part of the channel 40 providing a ledge for the partition 42.

With reference to FIG. 5, a perspective view of a liner 22', similar to the liner 22, illustrates a first alternative embodiment of the invention for providing stress relief. The liner 22' is referenced with like, primed reference numerals relative to the liner 22 of the embodiment of FIG. 1 for representing similar elements. The liner channel 40' includes a plurality of longitudinally spaced punched circular holes 60' extending around the entire length of the channel 40'.

With reference to FIG. 6, a second alternative embodiment of the invention is illustrated. In this embodiment a mullion channel 40" includes a plurality of longitudinally spaced diamond-shaped apertures 60", extending around the entire length of the channel 40" for promoting stress relief.

With reference to FIG. 7, a third alternative embodiment of the invention is illustrated. Specifically, the liner mullion channel 40''' includes a plurality of closely spaced elongate slots 60-1''' with small circular apertures 60-2''' between adjacent ones thereof.

Each of the types of apertures 60', 60" and 60''' permit, and/or encourage, the liner to split in a specific area of the liner as and if required to satisfy stress requirements described above, without affecting the appearance or function of the refrigerator cabinet 10. In each embodiment the method of assembling the cabinet is the same as discussed relative to the first embodiment, other than the shape, quantity and spacing of the particular aperture chosen being different.

With reference to FIG. 8, a liner 70 is illustrated. The liner 70 is generally similar to the liner 22 of FIG. 1, except that it is provided for a side-by-side refrigerator which utilizes a vertical partition. As such, the liner 70 is provided with a channel 72 extending along the top wall 74, rear wall 76, and bottom wall (not shown), as is well known. The channel 72 may include any of the types of apertures described hereinabove, and is specifically shown utilizing small punched circular holes 78, such as illustrated in the embodiment of FIG. 5. Here, again, the use of such holes 78 permits, and/or encourages, the liner 70 to split in the mullion area of the liner 70 as and if required to satisfy the stresses described above, without affecting the appearance or function of the refrigerator.

Thus, in accordance with the present invention, the liner mullion channel includes a plurality of spaced slots used for promoting stress relief in a concealed area of the cabinet. The slots are entirely closed to provide rigidity and stability of the liner particularly during installation.

The disclosed embodiments of the invention illustrate the broad inventive concepts comprehended hereby.

We claim:

1. A method of assembling a plastic liner refrigerator cabinet comprising the steps of:
   providing an outer, metal shell, said shell including walls defining a front opening;
   forming a plastic tub shaped liner, said liner including an elongate channel wall portion for receiving a partition separating the cabinet into two refrigerated compartments with a plurality of longitudinally spaced apertures through said channel wall portion to concentrate stress at said apertures, each said aperture being completely surrounded by plastic of said channel wall portion;

inserting said liner in said shell through said front opening to define a space between said liner and said shell walls; and filling said space with a foamed in place insulation which adheres to said liner and said shell.

2. The method of claim 1 wherein said forming step includes the step of forming a pair of slots in said liner adjacent the front opening of said shell, when the liner is inserted in said shell.

3. The method of claim 1 wherein said apertures comprise elongate slots.

4. The method of claim 3 wherein each said slot is formed to converge to a point at one end.

5. The method of claim 3 wherein each said slot is formed to include a semi-circular portion at one end.

6. The method of claim 1 wherein said apertures comprise a plurality of spaced circular openings.

7. The method of claim 1 wherein said apertures comprise a plurality of spaced diamond shaped openings.

8. The method of claim 1 wherein said apertures comprise a plurality of closely spaced elongate openings.

9. The method of claim 8 further comprising a plurality of circular apertures disposed between adjacent ones of said elongate slots.

10. A method of assembling a plastic liner refrigerator cabinet comprising the steps of:

providing an outer, metal shell, said shell including walls defining a front opening;

forming a plastic liner having connected rear, top, bottom and opposite sidewalls to define a refrigerated space, and including an outturned flange connected to front edges of said sidewalls, each sidewall including a horizontal channel for receiving a partition separating the refrigerated space into two refrigerated compartments and an aperture in said channel through each sidewall to concentrate stress at said apertures, each said aperture being completely surrounded by plastic of said sidewall;

inserting said liner in said shell through said front opening with said liner flange proximate said front opening to define an insulation space between said liner and said shell walls; and filling said insulation space with a foamed in place insulation which adheres to said liner and said shell.

11. The method of claim 10 wherein each said aperture is formed to converge to a point at one end.

12. The method of claim 10 wherein each said aperture is formed to include a semi-circular portion at one end.

13. The method of claim 10 further comprising the step of inserting a partition in said cabinet within said channels to completely cover said apertures.

14. The method of claim 10 further comprising a plurality of spaced circular openings in each channel.

15. The method of claim 10 wherein said liner includes a plurality of spaced diamond shaped openings in each channel.

16. The method of claim 10 wherein said liner includes a plurality of closely spaced elongate openings in each channel.

17. The method of claim 16 further comprising a plurality of circular apertures disposed between adjacent ones of said elongate slots.

18. The method of claim 10 further comprising the step of sealing said apertures during said filling step.

19. A method of assembling a plastic liner refrigerator cabinet comprising the steps of:

providing an outer, metal shell, said shell including walls defining a front opening;

forming a plastic liner having connected rear, top, bottom and opposite sidewalls to define a refrigerated space, and including an outturned flange connected to front edges of said sidewalls, each sidewall including a horizontal channel for receiving a partition separating the refrigerated space into two refrigerated compartments and a closed-end aperture in said channel through each said sidewall to concentrate stress at said apertures, a portion of said liner above and below said aperture being connected forwardly of each said slot so that said liner is stronger to provide greater structural integrity;

inserting said liner in said shell through said front opening with said liner flange proximate said front opening to define an insulation space between said liner and said shell walls; and filling said insulation space with a foamed in place insulation which adheres to said liner and said shell.

* * * * *